United States Patent Office 3,576,620
Patented Apr. 27, 1971

3,576,620
PROCESS FOR THE RECOVERY OF NOBLE
METALS FROM INORGANIC AND ORGANIC
MATRICES
Harold W. Wilson, El Paso, Tex., assignor to
The Golden Cycle Corporation
No Drawing. Filed May 8, 1968, Ser. No. 727,666
Int. Cl. C22b 11/04
U.S. Cl. 75—101
14 Claims

ABSTRACT OF THE DISCLOSURE

A substantially non-aqueous process for the separation and recovery of noble metals, particularly gold, platinum, and the platinum group metals, from materials containing the same. The process comprises subjecting particulate, preferably finely divided, dry material to an iodine-containing ketonic solvent, with heating and agitation of the slurry, to effect solvation of, and thus separation of, the noble metals, and other constituents from the material. The liquid phase so derived is acidified and heated to effect volatilization of iodine by decomposition of iodine-noble metal compounds together with attendant liberation, i.e., precipitation of elemental noble metals due to the decomposition of organic and inorganic noble metal containing compounds. Alternatively, the noble metals may be separated and recovered from materials containing the same by first solvating the noble metals with aqua regia to obtain mixed metallic chloride salts, etc., of the noble metals present which are subjected to a ketonic solvent, which need not contain iodine, and the resultant mixture heated to remove excess ketonic material to leave an organic resinous residue containing noble metal inner complex compounds which are acidified and heated to effect decomposition thereof, and solvation of the non-noble metal components, thereby leaving a residue of elemental noble metals.

The present invention relates to a process for the separation and recovery of certain noble metals from any substance known to contain such noble metals in the metallic state. More particularly, the present invention relates to a process for the recovery of elemental gold, platinum and platinum group metals from any substance known to contain them in the metallic state. More specifically, the present invention relates to a non-aqueous process for the recovery of noble metals by the utilization of ketonic compounds capable of effecting separation of metallic noble metals by the formation of inorganic resinous noble metal inner complex compounds.

In the prior art, it is known to dissolve a noble metal, i.e. gold, with iodine in either its solid or vapor state, or to treat gold with chlorinated hydrocarbons, such as carbon tetrachloride, containing dissolved iodine to effect solution of the gold. However, since gold and iodine combine only until the vapor pressure of the iodine present reaches the equilibrium value 2Au+I$_2$⇌2AuI, it is not possible to effectively utilize either elemental iodine alone or elemental iodine in solution as proposed heretofore for total dissolution of gold to its soluble aurous iodide form because of a near total disability to control and regulate the vapor pressure of the iodine such that the noted equilibrium reaction will proceed completely to the right.

In addition, in at least one instance, the prior art suggests that when treating ore containing combined gold the ore may be treated with iodine together with a substance in which the iodine is soluble in the presence of a solute, the latter being in the preferred form of the invention water, although a non-aqueous solvent such as an organic solvent may be used. However, and as will become more apparent hereinafter, in the aforementioned prior art, namely Pat. No. 2,304,823, issued Dec. 15, 1942, it is set forth that the organic solvents of iodine which are suitable include carbon bisulfide, carbon tetrachloride, ethylene dichloride, paraffin oils, among others, all of which other than "alcohol" are neither soluble in or miscible with water and which, when brought into contact with molecular iodine dissolve such only in a physical sense to produce molecular dispersions of the iodine in such solvents. Simple evaporation of such solvent-iodine systems results in recovery of unchanged iodine or solvent. In fact forced evaporation by heating results in complete separation of the iodine phase from the organic solvent phase, both unchanged chemically from their original forms before being combined. In the discussion of the present invention following hereinafter it will become apparent that the "organic solvents" contemplated in Pat. No. 2,304,823 will "dissolve" iodine along with countless other organic solvents yet would be totally unusable either for dissolving gold or any other noble metal to any significant degree Furthermore, a perusal of the aforementioned patent clearly establishes that the utilization of "organic solvents" as set forth hereinafter is not contemplated or suggested whereby noble metal present in the material being processed by the present invention is separated in the form of internally complexed ring structures, not chelates, capable of subsequent decomposition for the recovery of elemental noble metals therefrom.

Still further, other prior art processes employ aqua regia in the processing of substances known to contain metallic noble metals for the purpose of dissolving such metals and for converting them into their metal chloride salts, which, in turn lend themselves to additional processing for conversion of their contents of metallic ions into metals. In such processing with aqua regia it is known to be absolutely necessary that after solvation of the metals has been completed and any insoluble material has been removed all excess nitric acid present in the resultant solution of metallic salts must be removed. The removal of this nitric acid is accomplished by repeated evaporations of the solution, to states of near dryness, at controlled low temperature accompanied by repeated introductions of concentrated hydrochloric acid during the evaporation procedure. However, as will also become readily apparent from the discussion following hereinafter, I have found that it is neither necessary or required to remove all of the nitric acid in resultant aqua regia-halide salt solutions of noble metals, i.e., gold, platinum, and platinum group metals, by the process of repeated evaporation with addition of concentrated hydrochloric acid prior to processing such solutions for recovery of their contents of noble metals in metallic form.

It is an object of the present invention to provide a process for the recovery of noble metals from inorganic and organic matrices by the utilization of ketonic compounds of a structure which permits the addition of iodine, gold, platinum, and platinum group metals to such ketonic compounds resulting in addition products which can be controllably decomposed to liberate the iodine, gold, etc., while at the same time preventing chemical or physical loss of the product, i.e. the noble metals in their metallic states.

Another object of the present invention is to provide a process for the recovery of noble metals from inorganic and organic matrices by the utilization of ketonic compounds wherein substantially all of the reactants employed, other than minor amounts of the ketonic materials consumed in the reactions occurring, are recoverable and reusable for the most part.

A further object of the present invention is to provide a process for the recovery of noble metals from inorganic and organic matrices which makes possible the recovery of noble metals from substances not heretofore recognized as containing noble metals.

Still another object of the present invention is to provide a process for the treatment of noble metal-containing ores, residues, i.e. tailings and slimes resulting from ore processing, and scrap metals or any substances known to have a content of metallic noble metals, to recover the noble metal content from such substances in elemental form.

Still another object of the present invention is to provide a significantly non-aqueous process whereby certain conditions prevail so as to render the process more economical than prior processes for the separation and recovery of noble metals from inorganic and organic matrices.

Still another object of the present invention, in accordance with the aforementioned objects, is to provide a process for the utilization of certain hydroxy ketone compounds, with or without a content of dissolved iodine, for the separation of noble metals from substances containing the same or halogen salts and acids of noble metals wherein in the latter case the halogen salts and acids of the noble metals are derived from the aqua regia solvation of substances containing the noble metals.

Still a further object of the present invention is to provide a process for the utilization of hydroxy ketone and non-hydroxy ketone compounds, set forth hereinafter, which are capable of dissolving and combining with organo-noble metal compounds present in naturally occurring inorganic and organic substances such as calcareous lake bed deposits, composted forest litters, peat mosses, lignaceous materials, high organic matter-content clays and slimes of both marine and non-marine origin, and other types of predominantly organic matter known to have been in contact with metallic gold, acidic gold salts or particulate or vaporous gold of submicron size or with any combination of these forms of gold, to recover the gold from such solutions in the metallic form.

Further objects and aspects of the invention will become apparent in the following discussion.

From the foregoing, and in the broader sense, it will be appreciated that this invention is predicated upon the utilization of certain special properties possessed by certain ketonic compounds utilized for the preparation of internally complexed ketonic-noble metal compounds as precursors to the recovery of such noble metals in elemental form. The ketonic compounds preferred for use in the process of the present invention comprise hydroxy ketone compounds capable of taking up one of the primary valencies of the noble metals, to be recovered, at the site of a replaceable hydrogen. Also, such hydroxy ketone compounds must possess groups which can become coordinated with the central atom through their lone pair of electrons where such radicals are separated from the replaceable hydrogen atom by chains of suitable length for the production of five or six membered ring structures containing the noble metal to be recovered. A classic example of such a hydroxy ketone compound as a preferred embodiment of a ketonic compound suitable for carrying forth the process of the present invention is diacetone alcohol.

Although the use of hydroxy ketone compounds of the properties set forth above are preferred overall, ketone compounds having no hydroxyl content, but possessing groups and chain lengths of the same order as noted above for the hydroxy ketone compounds, may be employed when used in conjunction with alcohols which are capable of combining with the chlorine ion of hydrogen chloride in the system where an example of such an alcohol is ethyl alcohol. In the process of the present invention, when the ketonic compounds are added to syrupy residues of noble metal halide salts, which are semi-anhydrous, which ketonic compounds contain alcohols as a portion thereof, either in chemical or physical combination therewith, the residual water present in the residues is liberated for the attendant tie-up of the chloride ion of any uncombined hydrogen chloride present. A representative reaction comprises:

(1)  $H_3C-CH_2-OH + HCl \rightleftharpoons H_3C-CH_2Cl + H_2O$

In addition to the use of hydroxy ketones and certain ketone-alcohol combination compounds, diketone compounds which have a methylene group adjacent to a carbonyl group, with the two carbonyl groups of the concerned diketone separated by one or two carbons, such as represented by the compound diacetylmethane, capable of existing in the enol form, as shown below, has been found highly suitable for use as the ketonic compound in the practice of the present invention.

(2) 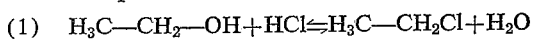
enol form

In general, any one of the following type compounds or specific compounds and combinations thereof, shown below, can be utilized in the practice of the present invention.

| Specific Compound | Type Compound |
|---|---|
| $H_3C-\underset{\underset{O}{\|}}{C}-CH_2-\underset{\underset{OH}{\|}}{\overset{\overset{CH_3}{\|}}{C}}-CH_3$ | $H_3C-\underset{\underset{O}{\|}}{C}-CH_2-\underset{\underset{OH}{\|}}{\overset{\overset{R_1}{\|}}{C}}-R_2$ |
| 2 hydroxy 2 methylpentanone-4 | hydroxyketone |
| $H_3C-\underset{\underset{O}{\|}}{C}-CH_2-\underset{\underset{O}{\|}}{C}-CH_3$ | $H_3C-\underset{\underset{O}{\|}}{C}-(CH_2)_x-\underset{\underset{O}{\|}}{C}-R$ |
| Pentane 2-4 dione | diketone |
| $H_3C-\underset{\underset{O}{\|}}{C}-CH_2-\underset{\underset{CH_3}{\|}}{CH}-CH_3 + H_3C-OH$ | $H_3C-\underset{\underset{O}{\|}}{C}-CH_2-\underset{\underset{R_1}{\|}}{CH}-R_2 + R-OH$ |
| 2 methylpentanone-4 + methyl alcohol | ketone + alcohol | where $R, R_1, R_2$ equal $C_nH_{2n+1}$, with $n$ preferably being an integer of less than 4.

A ketone "per se" presents no point of vulnerability to oxidative attack, however due to keto-enol tautomerism, as noted below, the enol form with its reactable double bonding is vulnerable to oxidative attack by strong oxidants only, such as hot, concentrated nitric acid:

(3) 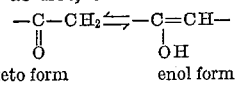
keto form    enol form

Only because of the existence of this desmotropic enol form of ketones is it possible to convert ketones into enol forms containing iodine as shown below using methyl isobutyl ketone as an example:

(4)
(5) 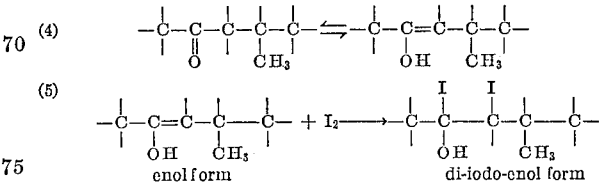
enol form    di-iodo-enol form

With regard to the use of a mixture of ketone and iodine as proposed in one embodiment of this invention, the iodine exists in the atomic form as well as in the elemental form and its reaction with gold, for example, is no longer controlled by the noted vapor pressure-equilibrium conditions.

In the instant invention, when the ketone containing iodine is brought into contact with metallic gold, for example, the di-iodine enol form compound of Equation 5, reacts to form a gold, iodine enol form compound and aurous iodide as shown below:

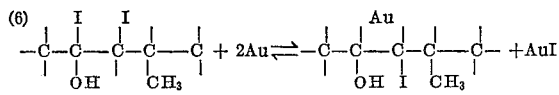

The gold-iodine enol form compound and the aurous iodide are held in solution by the ketone. As more aurous iodide is formed more ketone is converted into enol form which in turn reacts with elemental iodine held in solution by the organic ketone to form more di-iodine enol form compound which in turn reacts with more metallic gold to form more gold-iodine enol form compound and more aurous iodide causing all of the reactions to proceed to the right and completion until all of the available gold is finally converted into a combination of gold-iodine enol form compound predominantly and aurous iodide both held in solution by the ketone of the system. In addition to the ability of the di-iodine enol form compound to react with metallic gold some of the di-iodine enol form compound reverts to a mono-iodine keto form compound with liberation of hydrogen iodide as shown below:

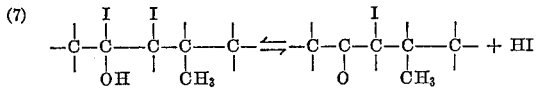

Some of the mono-iodine keto form compound in the presence of hydrogen iodide in turn reacts with metallic gold to form aurous iodide as shown above, and the original ketone reacting with iodine as shown in Equation 5, forms more di-iodine enol form compound. The cycle continues to the exhaustion of any gold providing sufficient iodine and organic ketone are available:

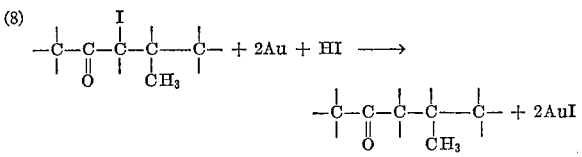

Further, in addition to the solvation power of the combination of iodine and organic ketone to form the above noted gold-iodine enol form compound and aurous iodide, the aurous iodide reacts with the unreacted organic ketone present in the system to form aurous iodide stabilized internally complex compounds of gold as illustrated below using diacetone alcohol as the ketone of the process:

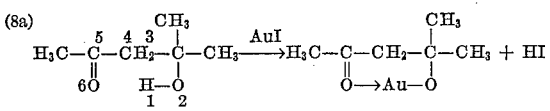

The numbered positions shown above show the diacetone alcohol has a hydrogen atom (in the 1 position) replaceable by metals (using a covalency), and in the 1,6 position to it is located an oxygen atom which can be linked to the metal by its lone pair of electrons to form the internally complex ring structure gold compound shown above.

Any ketone can be used in the proposed process as long as it is capable of taking up one of the primary valencies of gold in the halogen salt form (aurous chloride, bromide, and/or iodide) at the site of a replaceable hydrogen while at the same time such ketone possesses groups which can become coordinated with the central atom through their lone pair of electrons where such radicals are separated from the replaceable hydrogen atom by chains of suitable length for the production of five or six membered rings containing the noble metal, i.e., gold. It is to be understood that the gold-organic compounds shown as products of reaction in Equations 6 and 8a above were not defined by isolation per se and that the entire series of equations shown above are illustrative of only a portion of the total of complex reactions taking place but are given solely to illustrate what is believed to be the general mechanism of conversion of gold metal into complex organic gold compounds having no properties in common with the gold metal subjected to the proposed process. The principal intent of the process is to solubilize, separate, and isolate gold as metal and not to isolate and/or define the compositions of intermediate products. When the substance being processed by the instant invention contains so-called "rusty gold," or gold coated with metallic oxides such as ferric oxide predominantly, or the substance contains "dirty gold" or gold coated with water insoluble organic matter such as resins, gums, and the like, the combination of solvent action of the ketone to dissolve the organic matter coating the fold particles and the chemical action of the hydrogen iodide present as shown above under Equation 7 serves to remove the metallic oxide coatings from the gold particles. In the case of prior art attempts to use elemental iodine or iodine dissolved in chlorinated hydrocarbons due to the poor reactivity of elemental iodine with either metallic oxides or sulfides, even with solvent action on organic coatings by a chlorinated hydrocarbon, if present, practically no "rusty gold" is attacked. The following series of equations illustrate mechanisms of reaction between gold, hydrogen, iodide, and metallic oxides and their products of re-reaction using ferric oxide, $Fe_2O_3$ as an example comparable to reactions of oxides of manganese, copper, zinc, etc. with hydrogen iodide:

(9)
$2Au + Fe_2O_3 + 4HI \longrightarrow 2AuI + FeI_2 + FeO + 2H_2O$

(10)
$FeO + 2HI \longrightarrow FeI_2 + H_2O$

(11)
$4Au \cdot 2Fe_2O_3 + FeI_2 + 2HI \longrightarrow 4AuI + 5FeO + H_2O$ "rusty gold Thus, in the present process, between the combination of abrasive physical action and mixing the substance being processed with the ketone-iodine solution, the solvent action of both the initial ingredients as well as of the products of reaction, and the unique chemical reactions the metallic gold present regardless of its size, shape, or degree of contamination can be effectively dissolved to permit its removal in liquid solution from unwanted solid wastes. In turn the gold in elemental form is removed and recovered from such liquid solution as described above.

With regard to the use of aqua regia for the initial separation of noble metals, for subsequent recovery in elemental form by the present process, exemplary reactions of platinum and gold metals with aqua regia are found described in the literature and are shown below:

(12) $Pt + (6HCl + 2HNO_3) \rightarrow$
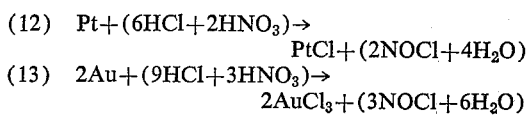
(13) $2Au + (9HCl + 3HNO_3) \rightarrow$
$2AuCl_3 + (3NOCl + 6H_2O)$ Nitrosyl chloride, NOCl, one of the products formed as shown in the following reaction of nitric acid and hydrochloric acid $$HNO_2 + 3HCl \rightarrow NOCl + 2H_2O + Cl_2\uparrow$$

is known to combine with many metallic chlorides among which are gold trichloride $AuCl_3$, and platinum hexachloride, $PtCl_6$, where one mol of nitrosyl chloride combines with two mols of such noted metallic chlorides to form double chloride salts. In the case of platinum tetrachloride and other metallic chlorides such as tin tetrachloride, $SnCl_4$, and titanium hexachloride, $TiCl_6$, it is known that two mols of nitrosyl chloride combine with each mol of the noted metallic chlorides of form metal nitrosyl chloride salts. Additionallly, the tendency of halide salts of both platinum and of gold to form addition compounds is so great that in spite of strong hydrolysis of these halide salts, stable hydrates are formed when such salts are brought into contact with water. For example, platinum tetrachloride, $PtCl_4$, combines with water like an anhydride to form $[PtCl_4(OH)_2]H_2$ which compound represents only one of a series of known hydroxochloroplatinic acids which exists as stable hydrates of platinum chloride having a content of 1, 4, 5, 7, or 8 mols of water per mol of $PtCl_4$. Equally stable gold halide complexes such as $[(AuCl_4)_2(OH)_4]H_6$ are formed when the auric halide comes into contact with water and crystallizes out as stable halide salt. Thus, based upon the above, in order to illustrate the formation of double halide salts with the nitrogen compounds concerned and the hydrate compounds of platinum and gold in the presence of aqua regia, Equations 12 and 13 are rewritten as shown below in Equations 14 and 15:

(14) $2Pt + (12HCl + 4HNO_3) \rightarrow [PtCl_3(OH)_2]H_2 + [PtCl_4(NOCl)_2] + (2NOCl + 6H_2O)$

(15) $4Au + (2OHCl + 6HNO_3) \rightarrow [(AuCl_4)_2(OH)_4]H_6 + [(AuCl_3)_2NOCl)] + (5NOCl + 8H_2O)$ In prior art processes requiring the elimination of nitric acid this is achieved essentially by repeatedly evaporating the aqua regia salt solutions where the nitrosyl chloride present is converted by hydrolysis into nitrous acid in the presence of excess hydrochloric acid which is added from time to time to assist in forcing the reaction to the right as shown below:

(16) $\quad NOCl + H_2O \rightarrow HONO + HCl\uparrow$

The unreacted nitrosyl chloride present in turn reacts with nitrous acid to produce dinitrogen trioxide, $N_2O_3$, which in turn, in the presence of atmospheric oxygen and water of the system is converted into a combination of nitric acid, $NHO_3$, and chlorine, $Cl_2$, to be carried out of the system by the aqueous vapors of hydrogen chloride. The following set of equations illustrates the reactions taking place for removal of nitrosyl chloride and other nitrogen compounds from the aqua regia system by use of prior art processes:

(17) $\quad 3HCl + HNO_3 \rightarrow NOCl + 2H_2O + Cl_2\uparrow$ $NOCl + H_2O \rightarrow HONO + HCl\uparrow$ $NOCl + HONO \rightarrow HCl\uparrow + N_2O_3\uparrow$ $N_2O_3 + O_2 + H_2O \rightarrow 2HNO_3$ (17a) $2NOCl + 3HONO + 3O_2 + H_2O \rightarrow 5HNO_3 + Cl_2\uparrow$ However, in this embodiment of my process, in order to circumvent the tedious, costly, and time consuming repeated evaporations and to reduce to a minimum the losses of platinum and/or gold by being volatilized as metal halide salts or by being converted into metal states to become a part of the insoluble residue, it has been found that the nitrosyl chloride, the nitrous acid, and any dinitrogen trioxide present from aqua regia solubilization can advantageously be left in the syrupy residues obtained from a single evaporation of aqua regia-halide salt solutions containing platinum and/or gold salts alone, for example, or as such salts may be present with other metallic halide salts such as of iron, manganese, copper, zinc, etc. The present process takes advantage of the fact that when hydroxy ketones are brought into contact with nitrosyl chloride, nitrous acid, and dinitrogen trioxide either when present as individual compounds or when present all together as a group of compounds, addition reactions take place where a replaceable hydrogen ion of the hydroxy ketone compound employed is replaced with nitric oxide derived from the particular nitrogen compound or compounds present, specifically, NOCl, HONO, and $N_2O_3$. Shown below is the reaction that takes place when 2 hydroxy 2 methylpentanone-4 is brought into contact with nitrous acid:

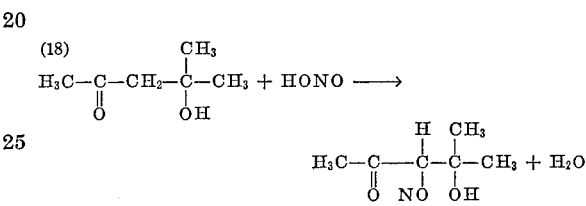

In turn, the nitric oxide-hydroxy ketone addition product hydrolyzes to form hydroxy diketones, water, and volatile nitrous oxide as illustrated below:

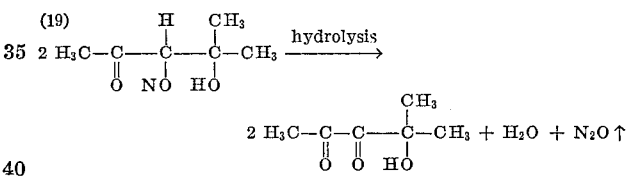

During the latter stages of the evaporation of the aqua regia-halide salt solution, hydrates of the metal halide acid salts which were previously formed (as shown in Equation 4 become dehydrated and in turn react with the nitrosyl chloride and/or the nitrous acid present to form addition products as shown below in Equation 20. Where the reaction of the tetrahydrate of chlorauric acid with nitrous acid is shown:

(20) $[(AuCl_4)_2(OH)_4]H_6 + HONO \rightarrow [(AuCl_3)_2HONO] + 5H_2O$

After it is evident that the aqua regia employed has dissolved all of the materials subjected to its treatment, or after any insoluble matter noted to be present has been removed by filtering such solutions, in the present process the solutions freed of any insoluble matters are evaporated to syrupy residues having compositions approximating those represented by the products shown in Equations 15 and 20 in which the metal of the compounds shown is gold but could be any one or a mixture of several metals including gold, platinum, copper, iron, and zinc as examples depending upon the free metals or metallic ions in combination as present in the original substances processed with the aqua regia. The syrupy residues obtained are mixed with amounts of hydroxy ketone or ketone-alcohol mixtures, as set forth previously, in slight excess of the amounts required to react with the residues. The resultant systems are then evaporated to almost complete dryness to eliminate uncombined ketonic material and to permit controlled decomposition of the halide salts accompanied by the liberation of free metals and liberation of nitrous oxide and hydrogen chloride, all as indicated in the following unbaanced equations using platinum halide hydrate and nitrous acid addition compounds as examples of the syrupy residues treated with the hydroxy ketone, 2 hydroxy 2 methylpentanone-4:

(21) $[PtCl_4(OH)_2]H_2 + [PtCl_4(HONO)_2] + H_3C-C-CH_2-\underset{OH}{\underset{|}{C}}(CH_3)-CH_3 \longrightarrow$

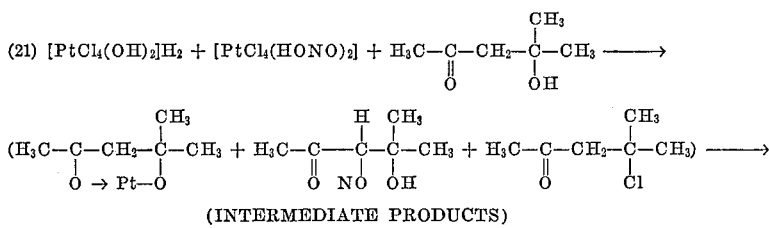

(INTERMEDIATE PRODUCTS)

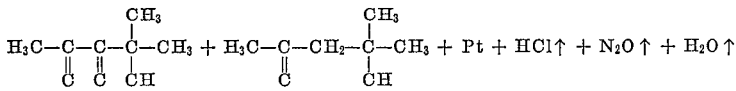

Equation 21 is presented primarily to illustrate what is considered to be the most important reactions taking place. It is to be understood that it is not possible to describe in detail all of the reactions taking place or the mechanisms involved due to the over-all extremely complex nature of the concerned system. It is important to note however that the system is in a state of reduction at all times thereby preventing the formation of any free chlorine or any other oxidizing compounds such as of nitrogen which would react with the liberated metals after they had been reduced to their free metallic state. At the same time al of the hydrogen chloride is released as such and at on time is volatilization of any metal halide salt possible.

From the foregoing it will be appreciated that the salient feature of the present invention resides in the utilization of ketones, of particular chemical structure set forth hereinbefore, which structure permits the addition of particular elements including iodine, gold, platinum, for example, to such ketones resulting in addition products which in turn can be controllably decomposed, such as by heating in an acidic system, to liberate specifically the iodine, gold, platinum, etc., while at the same time preventing any significant loss chemically or physically of the desired end products comprising the noble metals in their metallic states. Additionally, other than the minor amounts of ketonic compounds consumed in the reactions occurring, all of the chemicals employed for the separation and recovery process are recoverable and reusable. Therefore, the present process is characterized by a high degree of simplicity while permiting the recovery of noble metals not heretofore recognized as being present in abundance in certain organic substances.

The reaction shown below is illustrative of what is believed to take place when the residue of halogen salts of the noble metals alone or when present also with non-noble metal halogen salts both present in combined and uncombined form with either hydroxy ketone compound or with enol-form ketone compound, whichever had been used, is treated with concentrated sulfuric acid, 98+% $H_2SO_4$.

(22)

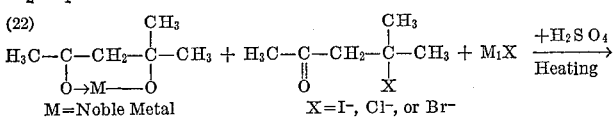

M=Noble Metal
can not be $Ag^+$, $Hg^+$, $Pb^+$,
or di-, or trivalent metal.

X=$I^-$, $Cl^-$, or $Br^-$
$M_1$=$Ag^+$, $Hg^+$, $Pb^+$, or di-, or trivalent metal

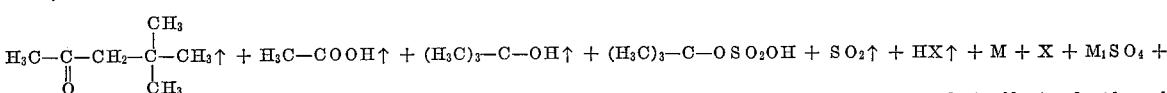

products of heat and acid pyrolysis.

When X is present in reactants as combined iodine it is liberated with products for the most part as elemental iodine—$I_2$. When X is present in reactants as combined chlorine or bromine it is liberated with the products as hydrogenated halogen—HX. Initial treatment with water of the non-volatilized products of the reaction shown above permits solution of both organic and inorganic sulfates and their removal from the insoluble noble metal residue to allow recovery of such noble metals as were present in their elemental states relatively free of non-noble metal content. Subsequent washing with water permits a near-total freeing of any content of foreign matter.

Regardless of the general nature of the materials to be processed, even though noble metals or their alloys in massive form can be completely dissolved upon prolonged dissolution and chemical reaction the materials to be processed are first subdivided by grinding, shearing, mincing, or by using whatever mechanical means are available and most suited to converting the concerned material into fine particles, preferably if alloys and the like to pieces smaller than 0.2 inch in maximum dimension, and if ores or similar materials, preferably to particle sizes of less than 0.003 inch to afford exposure of maximum surface area to chemical contact.

Dissolution of the contents of noble metals of the material being processed is achieved by subjecting the materials to chemical attack by use of either one or the other of the two following described solutions: (1) A liquid organic compound of the chemical nature of diacetone alcohol, containing dissolved iodine, or (2) aqua regia. If solubilization of the noble metals was achieved by use of the diacetone alcohol type compound containing dissolved iodine, after removing any insoluble solid residues by mechanical separation the resultant solution is freed of its content of unreacted diacetone alcohol type compound to leave an organic resinous residue containing noble metal inner complex compounds. If solubilization of the noble metals was achieved by the use of aqua regia, after removing any insoluble solid residues mechanically, the unreacted acid present is removed for the most part from the solution of solubles by evaporation. The resultant residue, predominantly metal halogen (chloride) salts is combined with diacetone alcohol type compound and the resultant mixture heated to remove excess diacetone alcohol type compound to leave an organic resinous residue containing noble metal inner complex compounds. Regardless of the method employed to obtain the residues of noble metal inner complex compounds, by the addition of concentrated sulfuric acid to such residues followed by heating, the residues are decomposed releasing volatile halogens and liberating particles of noble metals which in turn form aggregate masses which remain as acid insoluble solids in the sulfuric acid present. The aggregate masses of acid insoluble noble metals are separated and isolated by decanting the liquid acid which contains acid soluble non-noble metal sulfate salts, in cases where non-noble metals were present in materials processed. The isolated masses of noble metals in the same container are washed free of acid, and non-noble metal sulfate salts if present, with water, then they are dried and heated to dull red heat, cooled, and weighed as recovered noble metals.

It will thus be appreciated that noble metals in their metallic states or in metallic salt form are capable of being dissolved by their reacting chemically with certain liquid organic compounds possessing acidic and coordinating functional groups and a content of atomic iodine, or other halogen, as integral parts of their structures. When the materials containing noble metals have such in combination with halogens in the form of noble metal halogen salts the liquid organic compounds possessing the acidic and coordinating functional groups are capable of reacting with the noble metal halogen salts in the absence of additional atomic iodine in the liquid organic compounds employed since such required halogen will be present in the noble metal halogen salt itself. Regardless of whether the halogen of the system is introduced as such in chemical and physical combination with the liquid organic compound employed, or, as such would be present if introduced in chemical combination with the noble metals as noble metal halogen salts, the principal products of reaction between such liquid organic compounds, halogens, and noble metals are noble metal inner complex compounds which are soluble in the liquid organic compound present but are water insoluble. Additionally, these inner complex compounds are non-ionic, noble metal derivatives of the particular class of liquid organic compounds used in this process which contain the enolic hydroxyl group (—OH) as the acidic functional group and the carbonyl group (=O) as the coordinating functional group with both named functional groups being positioned with relation to each other in such a manner that in the final product the noble metals are implicated by coordinate valence bonding in five or in six membered ring structures of the liquid organic compounds possessing the two described functional groups.

The liquid organic compound selected for use must conform to the previously stated requirements especially with regard to possessing functional groups and having sufficient chain length and proper structure to allow ring formation as described. The following compounds are herewith noted as preferred embodiments of the process as the liquid organic compounds found most suitable for use and meeting all of the specified requirements:
Diacetone alcohol (synonym, Diacetone)

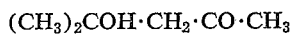

Acetonyl Acetone, $(CH_3 \cdot CO \cdot CH_2)_2$; and, Isopropylacetone (synonym, Methyl isobutyl ketone)

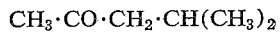

In the processing of certain naturally occurring materials having in addition to a content of noble metals appreciable amounts of organic substances such as resins, waxes, gums, humic acids, and partially degraded and decomposed organic matter, studies have shown that the noted liquid organic compounds containing dissolved iodine in admixture with primary and secondary alcohols of three to five carbon chain lengths exert greater solvent action and allow isolation and recovery of larger amounts of noble metals found present by use of the present process in treating such materials than when such alcohols were not present in the treatment chemical system. Ratios of one part of the alcohol to three parts of the liquid organic compound containing dissolved iodine appeared to be optimum for use in processing such materials.

The amounts of liquid organic compound to be used in the proposed process will depend upon both the nature of the material being processed as well as upon its content of noble and divalent metals present as metals and as reactable metallic salts. Regardless of the nature of the material being processed sufficient liquid organic compound must be present to both thoroughly wet the material to permit its agitation and at the same time to allow the liquid to hold in solution the metal addition compounds formed during the period of chemical solubilization and reaction to permit removal from insoluble solid matter in due course of the processing. When the liquid organic compound with a content of dissolved iodine is used as the solvation agent, the amount of iodine required will be directly related to the contents of noble metals and reactable divalent metals and salts present in the materials being processed. Ordinarily the iodine requirement can be determined by stoichiometrically relating the various noble metal and divalent metal contents present as metals in a given amount of the material to be processed to the amounts of iodine that would be required to convert such contents of metals into their respective metal iodide salts. In the processing of certain types of ores and tailings, and substances containing more than appreciable amounts of organic matter, part of the iodine present in the liquid organic compound employed may be adsorbed by clay or organic matter present. Thus, in the processing of these type materials more iodine may be required than would be indicated from stoichiometric determinations. With such materials small scale experimental studies are satisfactorily employed to determine the amounts to be used of both the liquid organic compound and iodine. The results of extensive experimental studies in using the present process on common ores and similar materials having noble metal contents ranging between 0.005 to 5.000 ounces of noble metal per ton of material and containing less than one percent of silver and uncombined, divalent metals such as copper and zinc showed that at least 98+% of their contents of noble metals could be isolated and recovered by using the described liquid organic compounds having an iodine content in the range of 0.001% to 0.1% based upon the weight of liquid organic compound employed. In using the present process on noble metal alloys having gold and/or platinum contents of approximately 50% or above a slight excess, 0.1%–0.5%, of iodine over and above the calculated stoichiometric requirements enhances the rate of solubilization of such alloys but otherwise was neither of any particular value nor apparently detrimental. In processing certain other noble metal alloys, especially those known to have exceptionally large contents of copper, such as is true of ten and fourteen carat gold alloys, it is preferable to employ aqua regia as the solvation agent to convert the noble metals into halogen salts followed by converting the halogen salts into the inner complex compounds inasmuch as excessively large amounts of iodine consumed by the copper forms products which in turn enhance formation of non-noble metal polymerized resins which in turn require unduly large amounts of concentrated sulfuric acid and prolonged heating to effect decomposition of such resinous matter and complete liberation of the noble metals from their inner complex compounds.

Although noble metal solvation and chemical conversion to noble metal inner complex compounds can be achieved by subjecting materials to treatment with the aforedescribed liquid organic-iodine compounds at ambient temperatures, it is preferable to conduct such processing at elevated temperatures. By processing either ores or alloys containing noble metals at temperatures slightly below or at the boiling points of the liquid-solid systems concerned dissolution and reaction of the noble metal contents can be brought about in approximately one-fifth as much time as when the same type systems are processed at ambient temperatures. In addition such systems, even when mildly agitated, regardless of their temperatures have an eight to ten-fold increase of dissolution of their noble metal contents over similar non-agitated systems being processed. The solutions containing the soluble noble metal inner complex compounds are preferably separated from insoluble solid residues while the systems are still hot with such separations being made by decanting, filtering, or by centrifuging, whichever seems most suitable. Washing the insoluble residues free of entrapped liquid, and adsorbed iodine in certain cases, with hot washing liquid is preferable as use of less liquid organic compound when hot is required to effect a more complete and more rapid separation of the solubles from the unwanted insoluble matter.

In processing both the insoluble residues and the isolated solutions containing the noble metal inner complex compounds by heating to volatilize and recover their contents of chemically uncombined liquid organic compound for reuse, it is preferable, in order to recover the maximum amounts of the liquid of unaltered composition in the shortest time period possible to subject each of the two systems named, separately and individually to the heat treating at reduced pressures in the range between 20 and 100 mm. of Hg which allows heating to be carried out in the range of about 70° to 110° C. with such processing thereby preventing decomposition of such as diacetone alcohol, for example, to acetone which decomposition takes place at atmospheric pressure when diacetone alcohol is heated to boiling and volatilized. If it is not desired to recover the liquid organic compound employed ordinary evaporations can be carried out at atmospheric pressure at or near the boiling point of the systems concerned without resulting in noble metal loss from the system even when the system is taken to complete, apparent, dryness to form non-volatile, resinous residues containing the noble metal inner complex compounds.

In regard to recovering the iodine, if used in the processing, economics appear to be the governing factor. If the iodine is to be recovered for reuse sufficient amounts of concentrated sulfuric acid are added to the above-noted resinous residue to result in the formation of a liquid system. If insufficient acid was added a gel formed additional acid is added as required to obtain a liquid system. The larger amount of resinous residue involved the greater the quantity of sulfuric acid required. Initially, gentle heating of the resinous residue-acid mixture will cause an immediate release of vaporous iodine changing into sublimed crystals which can be collected if desired on a glass palte or other chemically inert surface placed over the surface of the vessel containing the resin-acid mixture being heated. As the temperature of the mixture rises and no additional iodine is released as noted visually the vessel cover employed as the collecting surface with its content of iodine crystals is removed from the vessel and the iodine is removed mechanically and stored for reuse.

After the iodine or other halogens, if halogen salts were processed, has been released from the resinous residue-acid mixture by initial heating, the mixture is heated to a state of moderate fuming, to a temperature in the range of 280°–300° C., in order to effect decomposition of the noble metal inner complex compounds and the liberation of the noble metals in their metallic states. The strong reducing capacity of the acid-organic matter system in combination with its elevated temperature causes the noble metals to be liberated from the noble metal inner complex compounds in such a manner that as they are liberated they migrate towards each other as tiny metallic fragments to combine physically and assume a final physical state appearing usually as one or as several large aggregate masses of metallic pieces. If mixtures of gold and platinum are present in the resinous residues being processed the aggregate masses obtained are found to be mixtures of large aggregates of each metal in physical contact only and mechanically separable. When the acid systems at this stage of processing become clear and of a color approximating that of a strong infusion of tea leaves, the required extent of decomposition of the noble metal inner complex compounds and the liberation of their contents of noble metals has been achieved. It is neither necessary nor desired to prolong heating or to heat the acid system to temperatures in excess of those given as such heating may cause a partial loss of the noble metals if the system loses its total reducing capacity or is caused to fume excessively.

It is considered extremely noteworthy that with the use of this proposed process because of the formation of aggregate masses rather than powdered or finely divided noble metals the hot acid along with any content it may have of anhydrous metal sulfates such as silver and copper sulfates which are soluble in hot, concentrated sulfuric acid can be decanted to recover the insoluble, highly pure aggregate masses of noble metals without loss. The non-noble metals contained as soluble sulfates in the decanted acid can be recovered, if desired, by known methods for such recoveries. The aggregate masses of noble metals as residues resulting from decantation of the liquid acid, and soluble non-noble metal sulfates if present, are washed with hot water in the same container until free of acid and soluble sulfate salts after which the residues are dried and then heated to a dull red heat to free them of any occluded acid they may contain. If the examination of the final residues indicate contents of other than noble metals the residues can be further processed to remove residual impurities by being subjected to treatment with singular mineral acids as is conventionally done.

The following examples are included to more specifically illustrate the process comprising the present invention.

EXAMPLE I

A representative lot of an ore which by fire assay evaluation showed a content of 1.451 oz. gold and 0.150 oz. platinum per each ton of the ore was ground to a fineness such that its particles were approximately 0.0025" to 0.0030" in size.

A representative ten assay ton lot, 291.70 grams, of this pulverized ore without drying or having received any prior treatment other than having been ground was combined with 150 ml. of industrial grade diacetone alcohol containing 0.05 gram of iodine. This mixture while being heated and kept at a temperature near its boiling point, about 165° C., was continuously agitated by stirring for a time period of approximately 30 minutes. The mixture after agitation, and without intentional cooling was separated by filtration to give an insoluble residue, filter cake, and a solution, filtrate. The filter cake was washed on the filter with three separate 10–20 ml. portions of hot, iodine-free diacetone alcohol until the resultant washings appeared to be colorless to indicate the filter cake to be essentially free of internally complexed structures of noble metals and of metal-enol-iodine compounds.

The filter cake, in a closed system under reduced pressure, about 100 mm. Hg, was heated to approximately 105° C. to volatilize and recover its content of diacetone alcohol used in the washing operation. The filtrate was likewise processed for volatilization and recovery of its content of diacetone alcohol which was combined with that recovered from the filter cake where the total amount of diacetone alcohol recovered and reserved for reuse amounted to 94% of the amount introduced in all of the aforedescribed processing.

Approximately 25 ml. of concentrated sulfuric acid, 98.5%, $H_2SO_4$ were added to and mixed with the isolated resinous residue as obtained above. The resinous residue-acid mixture was gently heated to cause release of its content of iodine which because of its small quantity was not trapped and recovered. Noting visually that no additional iodine was being released, absence of colored vapors, the acid mixture was heated to moderate fuming, a temperature of approximately 300° C., and kept at or near this state until the liquid had achieved a coloration approximating that of a strong infusion of tea leaves, a deep red-brown color. The hot solution was then permitted to cool to a temperature of about 160° C., the near absence of fumes, after which the liquid portion was decanted into a separate container to leave an acid-insoluble solid residue. The decanted acid after being cooled was reserved for reuse in the same capacity as the original concentrated sulfuric acid had been employed.

The acid-insoluble residue while in the same container from which the liquid acid solution had been decanted was washed several times with hot water, by decanting the wash liquid after each washing, until the washings were determined to be free of acid as tested with neutral litmus paper. The solid residue was then transferred to a weighed platinum dish. The dish with residue was gently heated to evaporate water then heated to a dull red heat to volatilize any content of occluded sulfuric acid after which the weight of cooled residue was determined.

Chemical analysis of the residue, recovered as described above, which had a weight of 17.0 mgs. showed the residue to be composed of 98.5% of a combination of 92.2% gold as Au and 7.8% platinum as Pt. These values equated to one assay ton of the ore concerned would show such ore to contain 1.544 oz. gold and 0.131 oz. platinum per ton.

EXAMPLE II 10.00 grams of minced pieces, less than 0.2″ in size, of a noble metal alloy known to contain 75.00% Au, 10.50% Ag, and 14.50% Cu were dissolved in 100 ml. of a near boiling solution of diacetone alcohol containing 10 grams of iodine, which amount was determined to be a slight excess of the amount of iodine required, as determined stoichiometrically, to convert the calculated amount of each metal present in the alloy into its respective metal iodide salt.

The resultant solution containing the dissolved alloy was heated under reduced pressure, approximately 100 mm. Hg, at a temperature of about 108° C. to remove and recover the volatile matter and to leave a resinous, semi-solid, non-volatile residue. The volatile matter recovered and determined to be unaltered diacetone alcohol amounted to approximately 96% of the total amount of diacetone alcohol introduced.

50 ml. of concentrated sulfuric acid were added to and mixed with the resinous residue and the mixture was gently heated to effect release of iodine which was trapped as sublimed crystals on a glass plate covering the vessel being used. The glass cover with iodine crystals was removed after it was visually determined no additional iodine was being released. 9.8 grams of iodine were removed from the collecting cover glass and stored for resuse as such.

The heating vessel, with the iodine-free acidic contents, was re-covered with the glass cover and heating was continued until the mixture reached a temperature of about 300° C. as indicated by the presence of fumes. Heating was continued while maintaining the noted temperature until the liquid in the vessel became clear and of a deep red-brown color after which the vessel and contents were allowed to cool to a temperature of approximately 160° C. The liquid portion was decanted from the acid insoluble solid residue which was washed repeatedly with hot water, decanting the wash water after each washing, until the washings showed a total absence of acid. The residue was then transferred to a weighed platinum dish, dried, heated to dull red heat, and the dish and contents weighed to show a weight gain of 7.5489 grams as the weight of the residue.

Chemical analysis of the recovered residue showed it to contain 99.22% Au and 0.78% Cu. The 99.22% gold content of the recovered residue represents the isolation and recovery of 99.86% of the gold contained in the 10.00 grams of alloy subjected to the described process.

EXAMPLE III 7.0000 grams of a metallic substance known by chemical analysis to contain 6.9454 grams of gold and 0.0546 gram of copper, which substance was obtained as a product from the processing of 10.00 grams of a noble metal by use of the process described in Example II, was dissolved in 20 ml. of warm aqua regia solution (1 part con. $HNO_3$+4 parts con. HCl).

The resultant solution from the aqua regia solvation of the substance being processed was evaporated to a state of near-dryness at a temperature of approximately 95° C. to leave a residue of mixed acidic metal chloride and nitrate salts of gold and copper in combination with residual amounts of oxides of nitrogen and uncombined nitric and hydrochloric acids. To this residue approximately 3 ml. of acetonyl acetone, $(CH_3 \cdot CO \cdot CH_2)_2$, was added and mixed with the residue after which the mixture was heated to a temperature of approximately 120° C. to promote and accelerate reactions to form the metal acetylacetonate salts, predominantly those of gold as

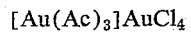

and to effect release and removal of chloride as chlorine and the oxides of nitrogen while at the same time effecting removal of the slight excess of acetonyl acetone from the system by its being volatilized as such.

30 ml. of concentrated sulfuric acid was added to and mixed with the residue of metal acetylacetonate salts after which this acidic mixture was heated to a state of moderate fuming, at a temperature of approximately 290° C., and kept in or near this state until the liquid portion became clear and was a deep red-brown colored liquid. The liquid portion of hot acidic solution, after being allowed to cool to a near-absence of fuming, about 150° C., was decanted to leave an aggregate mass of solid, acid-insoluble residue which was washed with water until free of acid. The residue of solid matter after being transferred to a weighed platinum dish was dried, heated to dull red heat, cooled, and weighed. The product of metal residue was 6.9453 grams.

Analysis of the 6.9453 grams of product showed it to be 99.95% Au. Based upon the weight of gold present in the 7.0000 grams of metallic substance subjected to the process, the amount of gold as Au recovered, and having a purity of 999.5/10000 fine, was 99.95% of that contained in the substance processed.

EXAMPLE IV

A representative five assay ton lot, 145.35 grams, of a finely ground, naturally occurring carbonaceous mineral substance referred to as lignaceous peat, which by use of conventional methods such as fire assay test and by alkali cyanide processing showed no determinable content of gold either as metal or as metal salts, was combined with 100 ml. of methyl isobutyl ketone containing 0.10 gram of dissolved iodine. This mixture, while being stirred, was heated to a temperature of approximately 115° C. After about one hour of mixing at the noted temperature the liquid of the mixture while still hot was separated from insoluble solid matter by filtration. The insoluble residue was washed free of occluded solubles with four 20 ml. portions of iodine-free, hot methyl isobutyl ketone and the washings combined with the filtrate.

The insoluble solid residue and the filtrate with combined washings were processed separately for recovery of their individual contents of uncombined methyl isobutyl ketone by use of low temperature heating under reduced pressure, approximately 60° C. at 100 mm. Hg. The quantity of recovered methyl isobutyl ketone represented about 95% of the total amount introduced as such in the aforedescribed processing.

20 ml. of concentrated sulfuric acid were added to and mixed with the resinous residue as obtained above. The resin-acid-iodine mixture was gently heated to effect release of the iodine which was not trapped. The temperature was increased to about 300° C. and heating at this temperature was continued until the liquid was clear and red-brown in color after which the liquid was allowed to cool to a temperature of about 150° C. at which time it was decanted from the acid-insoluble, solid residue present.

The acid-insoluble, solid residue was washed repeatedly with hot water by decantation until wash water showed no content of acid after which the residue was transferred to a weighed platinum dish, dried, heated to dull red heat, cooled, and re-weighed to show the weight of the substance recovered to be 0.57 mg.

Chemical analysis of the recovered residue of 0.57 mg. showed it to consist of 98.35% Au, 0.37% $Fe_2O_3$, and 1.28% $SiO_2$. This amount of recovered gold shows the so-called "gold-free" lignaceous peat subjected to the noted process to actually have a gold content amounting to 0.112 ounce of gold per ton of the lignaceous peat concerned.

EXAMPLE V

Several representative 10 assay ton lots, 291.7 grams, of the finely ground lignaceous peat as was processed as described in Example IV were individually and separately processed in the same manner as described in Example IV, with the exception that in place of using 100 ml. of methyl isobutyl ketone containing 0.1 gram of dissolved iodine, combinations of the acetone in combination with alcohols with a content of dissolved iodine were used in amounts as shown below. Also shown below are the amounts of residues recovered, their gold contents in percents, and the related gold content in ounces of gold per ton of the material concerned.

| Amounts of acetones and alcohols used (expressed in mls.) (containing 0.1 gm. $I_2$) | Weight of recovered residue (mgs.) | Per cent gold content of residues | Oz. Au/ton of peat |
|---|---|---|---|
| 80 ml. methyl isobutyl ketone and 20 ml. 2° butyl alcohol | 1.45 | 98.44 | 0.143 |
| 75 ml. diacetone alcohol and 25 ml. n-butyl alcohol | 1.42 | 98.31 | 0.139 |
| 75 ml. diacetone alcohol and 25 ml. isopropyl alcohol | 1.32 | 98.57 | 0.130 |
| 75 ml. acetonylacetone and 25 ml. isopropyl alcohol | 1.39 | 98.71 | 0.137 |

What is claimed as new is as follows:

1. A process for the separation and recovery of noble metals in metallic form from a residue of halogen salts and acids of noble metals resulting from the aqua regia solubilization of said noble metals from materials containing the same which comprises:

reacting said noble metal halogen salt and acid residue with a ketonic solvent selected from the group consisting of:

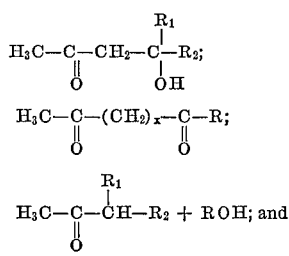

admixtures thereof, wherein:

R, $R_1$ and $R_2 = C_nH_{2n+1}$, and
    $x$ = an integer of no more than 2 to form a resinous residue comprising internally complexed ketonic-noble metal compounds;
    mechanically recovering said resinous residue of internally complexed ketonic-noble metal compounds from said ketonic solvent;
    decomposing the internally complexed ketonic compounds by heating in an acidic system to precipitate said noble metals in elemental form; and
    mechanically recovering said precipitated noble metals from said acidic system.

2. The process of claim 1 wherein said acidic system is established with concentrated sulfuric acid.

3. A process for the separation of noble metals from substances containing said noble metals, which comprises:

solubilizing said noble metals by treating said substance with an iodine-containing ketonic solvent selected from the group consisting of:

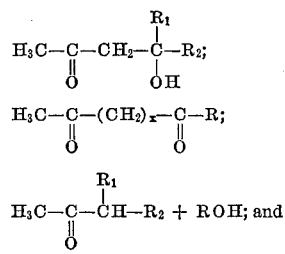

admixtures thereof wherein:

R, $R_1$ and $R_2 = C_nH_{2n+1}$, and
    $x$ = an integer of no more than 2 to form a resinous residue comprising internally complexed ketonic noble metal compounds;
    separating said resinous residue of internally complexed ketonic-noble metal compounds from said ketonic solvent; and
    decomposing the internally complexed ketonic compounds by heating in a concentrated mineral acid system to precipitate said noble metals in elemental form.

4. The process of claim 3 wherein $n$ is an integer of less than 4.

5. The process of claim 3 wherein said mineral acid is sulfuric acid.

6. The process of claim 3 wherein said solubilizing step includes agitating said iodine-containing ketonic solvent.

7. The process of claim 3 wherein said iodine is present in at least stoichiometric relation to the noble metals to be solubilized and about at least 0.001% to 0.1% based upon the weight of the ketonic solvent.

8. A process for the separation and recovery of noble metals in metallic form from substances containing said noble metals, which comprises:

finely dividing said noble metal-containing substance;
    acid solubilizing said noble metals of said noble metal-containing substance with aqua regia;
    evaporating the solution resulting from the aqua regia solubilization to a state of near dryness to leave a residue of halogen salts and acids of said noble metals;
    reacting said noble metal halogen salt and acid residue with a ketonic solvent selected from the group consisting of:

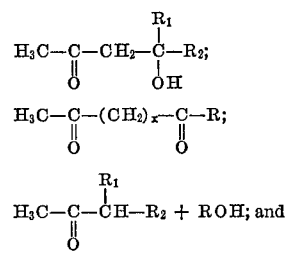

admixtures thereof wherein:

R, $R_1$, and $R_2 = C_nH_{2n+1}$, and
    $x$ = an integer of no more than 2 to form a resinous residue comprising internally complexed ketonic-noble metal compounds;
separating said resinous residue of internally complexed ketonic-noble metal compounds from said ketonic solvent;
decomposing the noble metal inner complex organic compounds by heating in concentrated mineral acid to recover the noble metal in elemental form; and
mechanically recovering said precipitated noble metals from said acidic system.

9. The process of claim 8 wherein said mineral acid is sulfuric acid.

10. The process of claim 8 wherein said ketonic solvent is selected from the group consisting of 2-hydroxy-2-methylpentanone-4; pentane 2-4-dione and 2-methylpentanone-4+methyl alcohol.

11. The process of claim 3 wherein the noble metal-containing substances are organic and inorganic halide salts of said noble metals.

12. The process of claim 11 wherein the said noble metal halide salts are derived from the solvation of the noble metals in the metallic state by an iodine-containing ketone solvent.

13. The process according to claim 11 wherein the noble metal halide salts are derived from the solvation of noble metals in the metallic state by the use of aqua regia.

14. The process for removing noble metals from particulate materials containing said elemental noble metals or compounds thereof which comprises reacting said particulate material with a halide or halide containing compound and a ketonic solvent selected from the group consisting of:

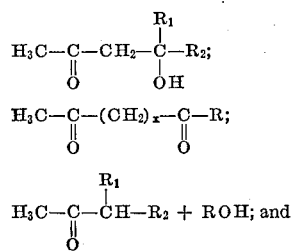

admixtures thereof wherein:
R, $R_1$, and $R_2 = C_nH_{2n+1}$, and
$x$ = an integer of no more than 2 to form an internally complexed ketonic noble metal compound which is capable of being separated from said ketonic solvent and decomposed by heating in a concentrated mineral acid to precipitate said noble metals in elemental form.

References Cited
UNITED STATES PATENTS

| | | | |
|---|---|---|---|
| 1,857,664 | 5/1932 | Schlotter | 75—101X |
| 3,169,056 | 2/1965 | Bertolacini | 75—121X |
| 3,169,831 | 2/1965 | Bertolacini | 75—101X |
| 3,251,646 | 5/1966 | Alon | 75—121X |
| 3,451,807 | 6/1969 | Scribner | 75—121X |

L. DEWAYNE RUTLEDGE, Primary Examiner
J. E. LEGRU, Assistant Examiner

U.S. Cl. X.R.
75—118, 121